US012154487B2

(12) United States Patent
Young et al.

(10) Patent No.: US 12,154,487 B2
(45) Date of Patent: Nov. 26, 2024

(54) MICRO-LED BURN-IN STATISTICS AND COMPENSATION SYSTEMS AND METHODS

(71) Applicant: Apple Inc., Cupertino, CA (US)

(72) Inventors: Vincent Z Young, San Francisco, CA (US); Mahesh B Chappalli, San Jose, CA (US); Tae-Wook Koh, San Jose, CA (US); Yifan Zhang, Palo Alto, CA (US); Jared S Price, Hayward, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/180,697

(22) Filed: Mar. 8, 2023

(65) Prior Publication Data

US 2024/0304133 A1 Sep. 12, 2024

(51) Int. Cl.
*G09G 3/30* (2006.01)
*G09G 3/32* (2016.01)

(52) U.S. Cl.
CPC ....... *G09G 3/32* (2013.01); *G09G 2320/0233* (2013.01); *G09G 2320/041* (2013.01); *G09G 2320/046* (2013.01)

(58) Field of Classification Search
CPC ......... G09G 3/30–3696; G09G 2300/04–0895
See application file for complete search history.

(56) References Cited

U.S. PATENT DOCUMENTS

| | | | |
|---|---|---|---|
| 7,211,452 B2 | 5/2007 | Cok et al. | |
| 8,077,123 B2 | 12/2011 | Naugler, Jr. | |
| 8,358,256 B2 | 1/2013 | Hamer et al. | |
| 11,164,541 B2 | 11/2021 | Holland et al. | |
| 2005/0083269 A1 | 4/2005 | Lin et al. | |
| 2011/0012908 A1 | 1/2011 | Daly | |
| 2011/0141149 A1 | 6/2011 | Inoue et al. | |
| 2012/0075354 A1* | 3/2012 | Su | G09G 5/10 345/690 |
| 2018/0075798 A1 | 3/2018 | Nho et al. | |
| 2019/0080666 A1* | 3/2019 | Chappalli | G09G 3/22 |
| 2020/0143744 A1 | 5/2020 | Kim et al. | |
| 2020/0388210 A1 | 12/2020 | Thielemans et al. | |
| 2021/0020101 A1 | 1/2021 | Van Eessen et al. | |
| 2022/0319398 A1 | 10/2022 | Li | |
| 2022/0366822 A1 | 11/2022 | Leerentveld | |
| 2023/0306884 A1* | 9/2023 | Choi | G06F 1/1626 |

OTHER PUBLICATIONS

International Search Report and Written Opinion for PCT Application No. PCT/US2024/018562 mailed Jun. 19, 2024, 12 pgs.

* cited by examiner

*Primary Examiner* — Sanghyuk Park
(74) *Attorney, Agent, or Firm* — Fletcher Yoder P.C.

(57) ABSTRACT

Image processing circuitry may include burn-in compensation circuitry that receives image data indicative of luminance outputs for display pixels of an electronic display and compensates the image data for burn-in related aging associated with the display pixels, generating compensated image data. Moreover, compensating the image data may include applying gains based on estimated amounts of aging associated with the display pixels and estimated amounts of current to be delivered to the display pixels. The image processing circuitry may also include burn-in statistics circuitry that tracks the estimated amounts of aging based on the compensated image data.

20 Claims, 11 Drawing Sheets

MICRO-LED BURN-IN STATISTICS AND COMPENSATION SYSTEMS AND METHODS

BACKGROUND

This disclosure relates to gathering burn-in statistics (BIS) and applying burn-in compensation (BIC) for electronic displays with time multiplexed or otherwise pulsed display pixels.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—including televisions, portable phones, computers, wearable devices, vehicle dashboards, virtual-reality glasses, and more—display images on an electronic display. To display an image, an electronic display may control light emission of its display pixels based at least in part on corresponding image data. As electronic displays are used over time, the pixels thereof may become increasingly more susceptible to image artifacts, such as burn-in related aging of pixels, which may be compensated by image processing.

Burn-in is a phenomenon whereby pixels degrade over time owing to the different amount of utilization (e.g., light emission) that different pixels emit over time. In other words, pixels may age at different rates depending on their relative utilization and/or environment. For example, pixels used more than others may age more quickly, and thus may gradually emit less light when given the same amount of driving current or voltage values. This may produce undesirable burn-in image artifacts on the electronic display. In general, the estimated aging due to pixels' utilization may be stored, accumulated, and referenced when compensating for burn-in effects. However, in some scenarios, such as micro-light-emitting-diode (LED) displays, the physical implementation of how the display works (e.g., via pulsed light emissions) may change the efficacy of traditional burn-in compensation systems.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Burn-in statistics collection and burn-in compensation may take into account the timing of pulses in electronic displays (e.g., micro-light-emitting-diode (LED) displays) that use pulsed light emissions. In these types of displays, the time averaged luminance output of a pixel is equivalent to the desired luminance level of the image data for that pixel. For example, a single image frame may be broken up into multiple (e.g., two, four, eight, sixteen, thirty-two, and so on) sub-frames, and a particular pixel may be illuminated (e.g., pulsed) or deactivated during each sub-frame such that the aggregate luminance output over the total image frame is equivalent to the desired luminance output of the particular pixel. In other words, the duration and frequency of the pixel emissions (e.g., pulses) during an image frame may be regulated to maintain an average luminance output during the image frame that appears to a viewer as the desired luminance output.

Furthermore, display image processing techniques may be performed on input image data such that the power (e.g., current and/or voltage) applied to the pixels drives the pixels to produce the desired amount of light. For example, as the pixels are utilized over the life of the display, the pixels may incur burn-in related aging, whereby the pixels emit less light when given the same amount of driving current or voltage values. As such, one display image processing technique may be to track the estimated aging of pixels and compensate the current or time for which the current is applied to the pixels to counter the effects of burn-in related aging.

Additionally, in some embodiments, a sub-pixel uniformity correction may be utilized to adjust the driving current, voltage, and/or activation timing for each pixel to account for differences in manufacturing between the pixels. For example, some pixels may exhibit different luminance outputs at the same voltage/current than other pixels, and such differences may be noted and/or preprogrammed during manufacturing to account for such differences.

However, in micro-LED displays the physical implementation of how the display works (e.g., via pulsed light emissions) may change the efficacy of burn-in compensation systems that track desired luminance levels and provide compensations in the luminance domain of the image data. As such, in some embodiments, display image processing techniques that alter the desired luminance, sub-frame timings, or otherwise changes the uncompensated total current (e.g., time integrated current) that would otherwise be provided to a pixel may be performed prior to burn-in compensation and sub-pixel uniformity correction.

Furthermore, in some embodiments, the burn-in compensation may be performed with, immediately subsequent to, immediately prior to, or between stages of the sub-pixel uniformity correction. For example, the sub-pixel uniformity gain correction may be applied prior to the burn-in compensation and a digital code conversion of the sub-pixel uniformity correction, which sets the digital code to be sent to the display panel that corresponds to the desired current/luminance, may occur after the burn-in compensation. As such, modifications to the image data due to burn-in compensation may be performed such that the modeled aging and compensation therefore of the pixels has increased accuracy (e.g., aligned with what is sent to the pixels) and increased effectiveness at reducing image artifacts.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
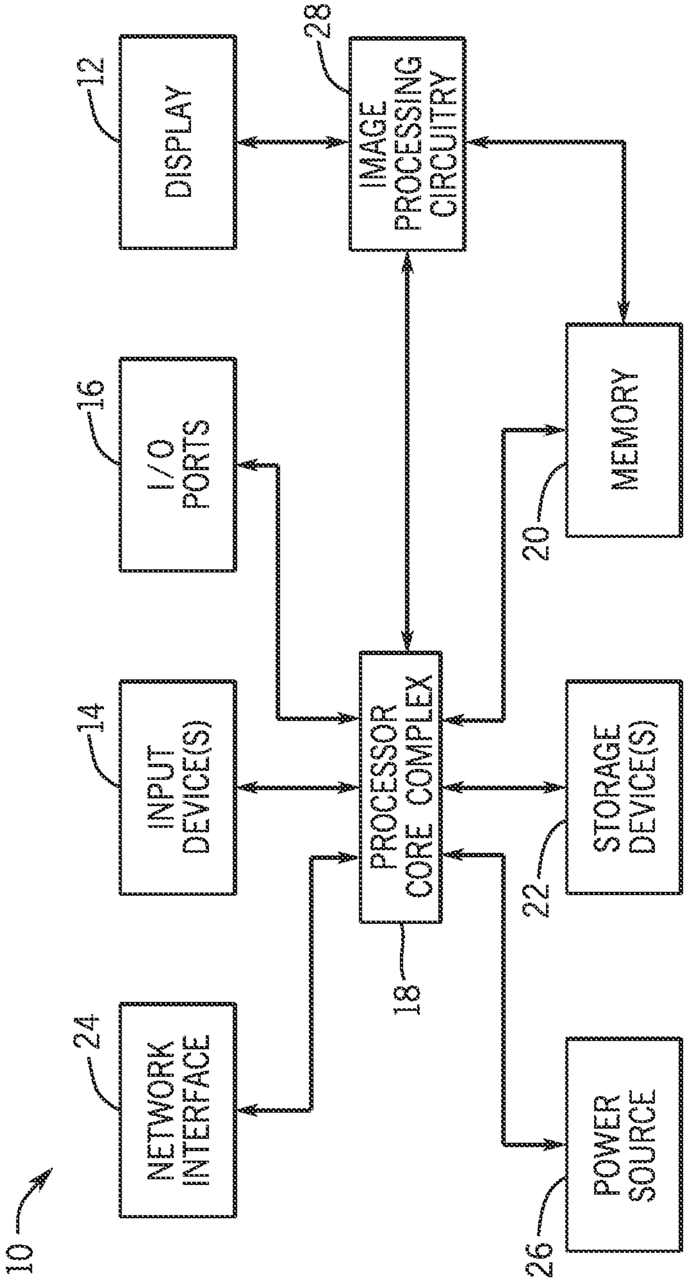
FIG. 1 is a block diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). As should be appreciated, color components other than RGB may also be used such as CMY (i.e., cyan, magenta, and yellow). Additionally or alternatively, image data may be indicated by a luma channel and one or more chrominance channels (e.g., YCbCr, YUV, etc.), grayscale (e.g., gray level), or other color basis. It should be appreciated that image data and/or particular channels of image data (e.g., a luma channel), as disclosed herein, may encompass linear, non-linear, and/or gamma-corrected luminance values.

To display images, the electronic display may illuminate one or more pixels according to the image data. In general electronic displays may take a variety of forms and operate by reflecting/regulating a light emission from an illuminator (e.g., backlight, projector, etc.) or generate light at the pixel level, for example, using self-emissive pixels such as micro-light-emitting diodes (LEDs) or organic light-emitting diodes (OLEDs). In some embodiments, the electronic display may display an image by pulsing light emissions from pixels such that the time averaged luminance output is equivalent to the desired luminance level of the image data. For example, a single image frame may be broken up into multiple (e.g., two, four, eight, sixteen, thirty-two, and so on) sub-frames, and a particular pixel may be illuminated (e.g., pulsed) or deactivated during each sub-frame such that the aggregate luminance output over the total image frame is equivalent to the desired luminance output of the particular pixel. In other words, the duration and frequency (e.g., as opposed to the brightness) of the pixel emissions during an image frame may be regulated to maintain an average luminance output during the image frame that appears to the human eye as the desired luminance output.

In some embodiments, the electronic display may be a micro-LED display having active matrixes of micro-LEDs, pixel drivers (e.g., micro-drivers), anodes, and arrays of row and column drivers. While discussed herein as relating to micro-LED displays, as should be appreciated, the features discussed herein may be applicable to any suitable display that using time multiplexed (e.g., pulsed) light emissions to generate an image on the electronic display. Each micro-driver may drive a number of display pixels on the electronic display. For example, each micro-driver may be connected to numerous anodes, and each anode may selectively connect to one of multiple different display pixels. Thus, a collection of display pixels may share a common anode connected to a micro-driver. The micro-driver may drive a display pixel by providing a driving signal across an anode to one of the display pixels. Any suitable number of display pixels may be located on respective anodes of the micro-LED display. Moreover, in some embodiments, the collection of display pixels connected to each anode may be of the same color component (e.g., red, green, or blue).

Additionally, the image data may be processed to account for one or more physical or digital effects associated with displaying the image data. For example, display image data may be compensated and/or enhanced to account for pixel aging (e.g., burn-in compensation), sub-pixel uniformity, cross-talk between electrodes within the electronic device, transitions from previously displayed image data (e.g., pixel drive compensation), warps, contrast control, and/or other factors that may otherwise cause distortions or artifacts perceivable to a viewer.

As discussed herein, as pixels are utilized over the life of the display, the pixels may incur burn-in related aging, whereby the pixels emit less light when given the same amount of driving current or voltage values. As such, burn-in statistics may be gathered to estimate and track an estimated amount of sub-pixel aging, and compensation may be performed to counter the effects of burn-in related aging. Additionally, in some embodiments, a sub-pixel uniformity correction may be utilized to adjust the driving current, voltage, and/or activation timing for each pixel to account for differences between the pixels (e.g., due to non-uniformity in manufacturing, non-uniformity in materials, etc.). For example, some pixels may exhibit different luminance outputs at the same voltage/current than other pixels, and such differences may be noted and/or preprogrammed during manufacturing to account for such differences.

In general, micro-LED displays utilize a digital code to operate sub-pixels as either enabled or disabled and may be time multiplexed to achieve the desired luminance output. As such, the physical current/voltages provided to the individual pixels, on which the burn-in compensation is based, may not be known until after each display image processing technique has been completed. As such, in some embodiments, display image processing techniques that alter the desired luminance, sub-frame timings, or otherwise changes the uncompensated current total (e.g., time integrated current over the image frame) that would otherwise be provided to a pixel may be performed prior to burn-in compensation and sub-pixel uniformity correction. Furthermore, in some embodiments, the burn-in compensation may be performed with, immediately subsequent to, immediately prior to, or between stages of the sub-pixel uniformity correction. For example, the burn-in compensation may be performed between a gain correction and a digital code conversion of the sub-pixel uniformity correction such that modifications to the image data due to burn-in compensation may be performed in accordance with the post-processed image data and the total current provided to each pixel.

With the foregoing in mind, FIG. 1 is an example electronic device 10 with an electronic display 12 having independently controlled color component illuminators (e.g., projectors, backlights, etc.). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a BLUETOOTH® network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). Although sometimes used to refer to a collection of sub-pixels (e.g., red, green, and blue subpixels) as used herein, a display pixel or pixel refers to an individual sub-pixel (e.g., red, green, or blue subpixel).

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
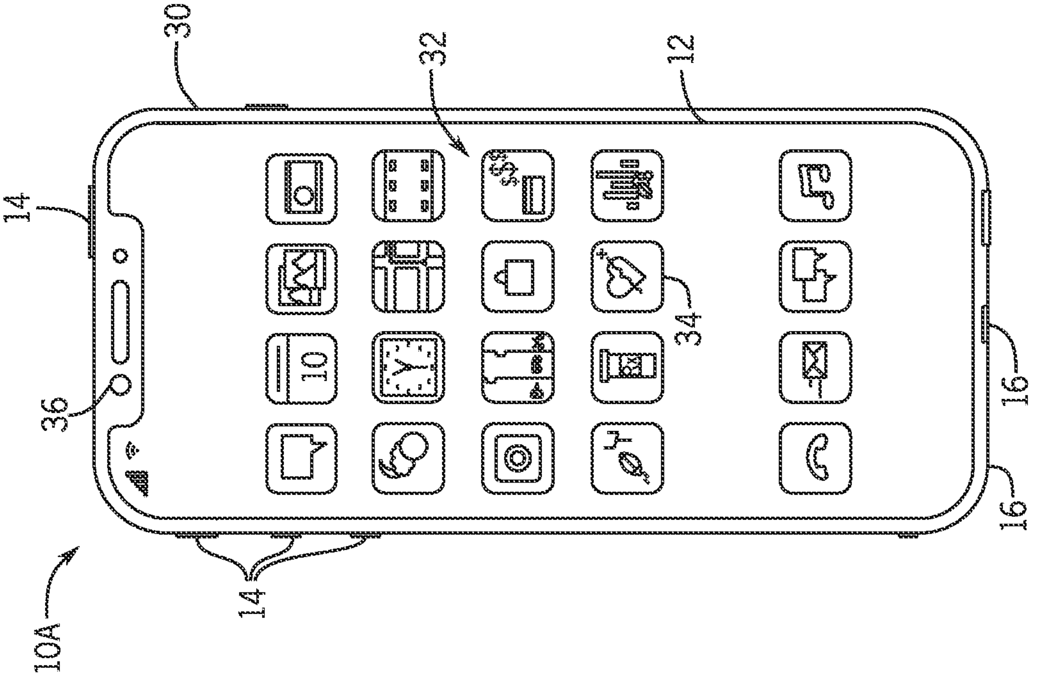
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
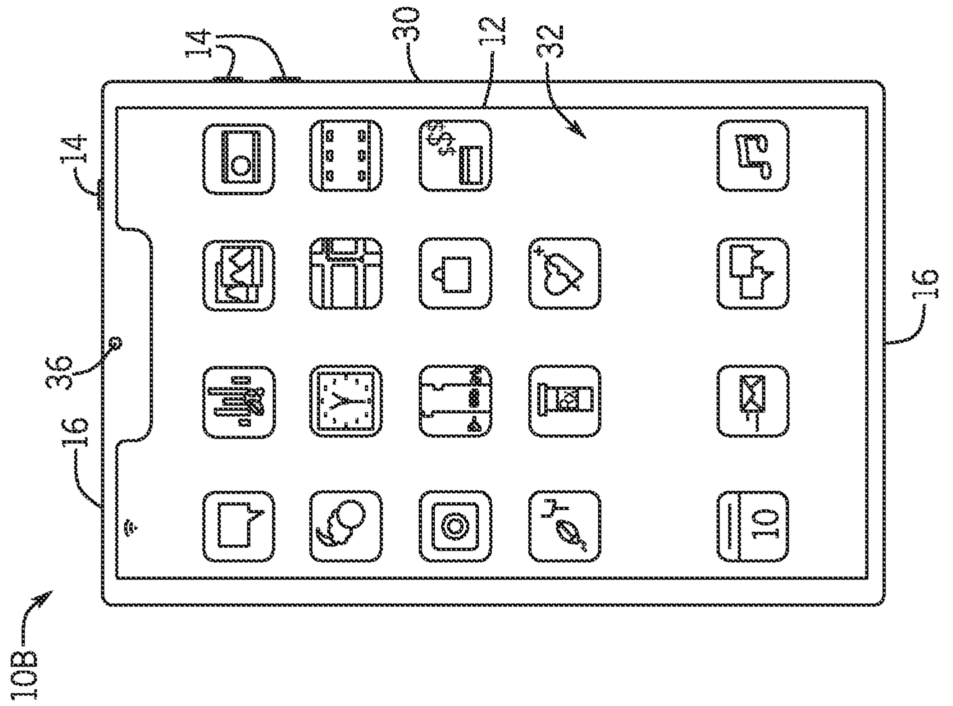
FIG. 3 is another example of the electronic device of FIG. 1 in the form of a tablet device, in accordance with an embodiment.
Figure 4:
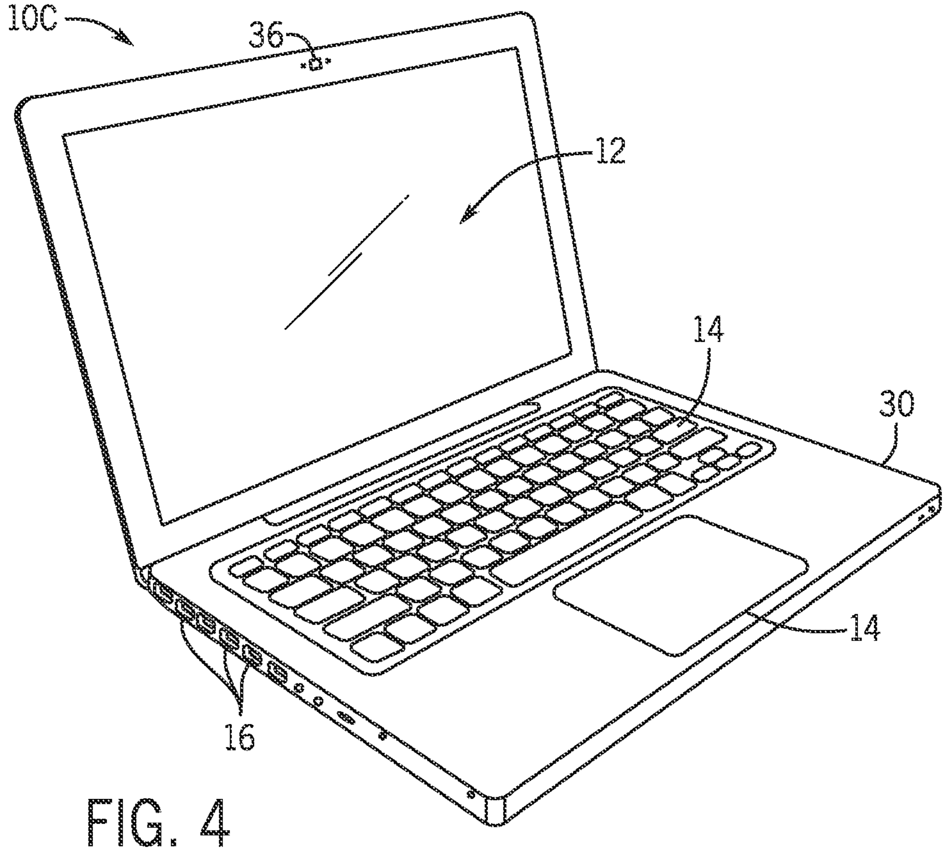
FIG. 4 is another example of the electronic device of FIG. 1 in the form of a computer, in accordance with an embodiment.
Figure 5:
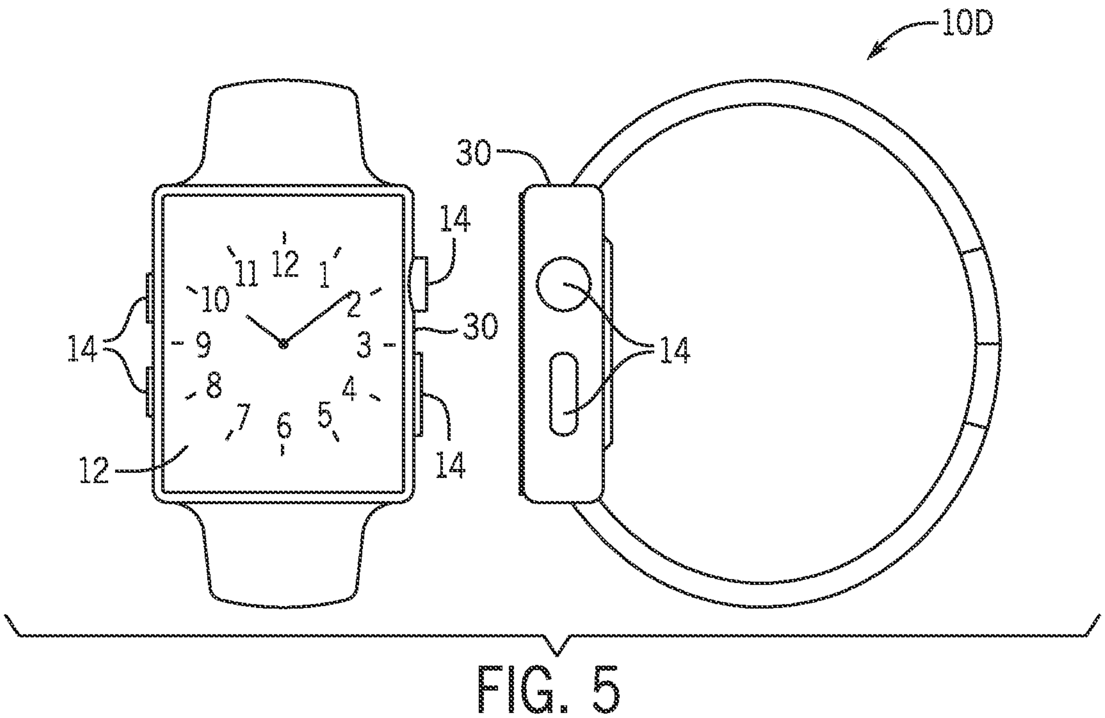
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C (e.g., notebook computer), is shown in FIG. 4. By way of example, the computer 10C may be any MACBOOK® model available from Apple Inc. Another example of a suitable electronic device 10 (e.g., a worn device), specifically a watch 10D, is shown in FIG. 5. By way of example, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
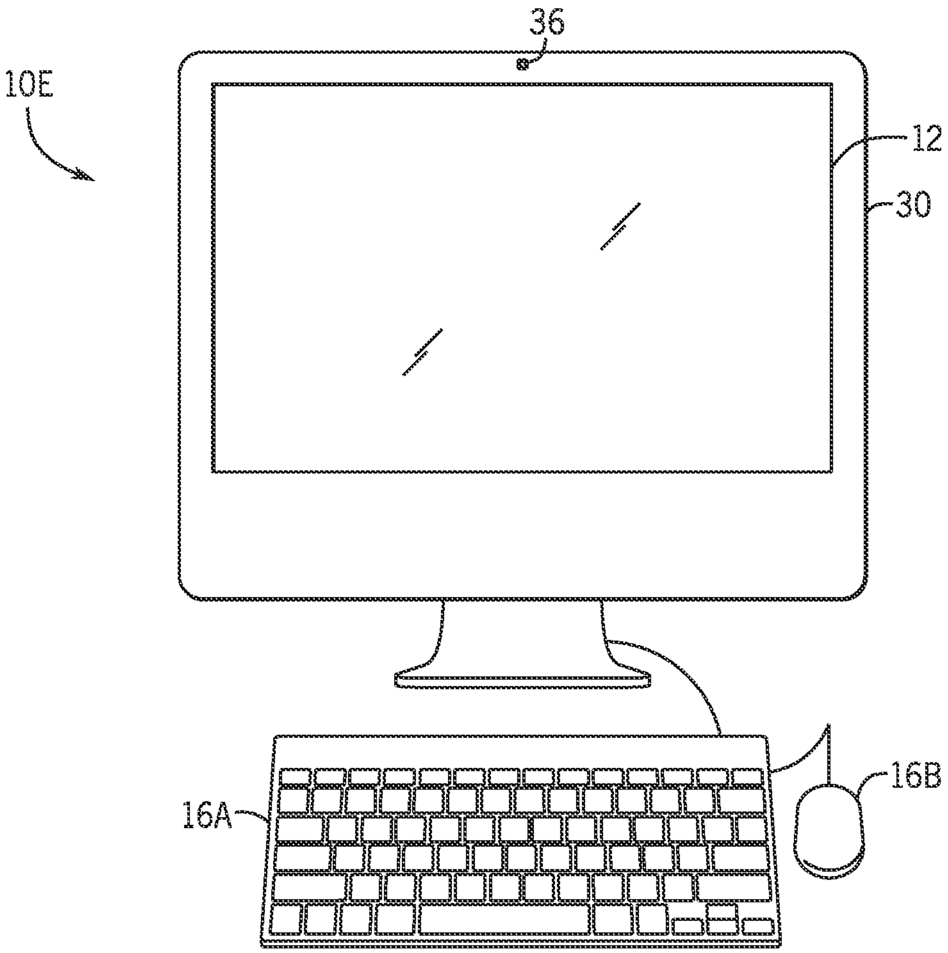
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer or a server, but may also be a standalone media player or video gaming machine. By way of example, the computer 10E may be an IMAC® or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As discussed above, the electronic device 10 may include one or more electronic displays 12 of any suitable type. In some embodiments, the electronic display 12 may be a micro-LED display having a display panel 40 that includes an array of micro-LEDs (e.g., red, green, and blue micro-LEDs) as display pixels. Support circuitry 42 may receive display image data 44 (e.g., digital coded image data) and send control signals 46 to an array 48 of micro-drivers 50. As should be appreciated, the display image data 44 may be of any suitable format depending on the implementation (e.g., type of display). In some embodiments, the support circuitry 42 may include a video timing controller (video TCON) and/or emission timing controller (emission TCON) that receives and uses the display image data 44 in a serial bus to determine a data clock signal and/or an emission clock signal to control the provisioning of the display image data 44 to the display panel 40. The video TCON may also pass the display image data 44 to serial-to-parallel circuitry that may deserialize the display image data 44 into several parallel image data signals. That is, the serial-to-parallel circuitry may collect the display image data 44 into the control signals 46 that are passed on to specific columns of the display panel 40. The control signals 46 (e.g., data/row scan controls, data clock signals, and/or emission clock signals) for each column of the array 48 may contain luminance values corresponding to pixels in the first column, second column, third column, fourth column . . . and so on, respectively. Moreover, the control signals 46 may be arranged into more or fewer columns depending on the number of columns that make up the display panel 40.

Figure 7:
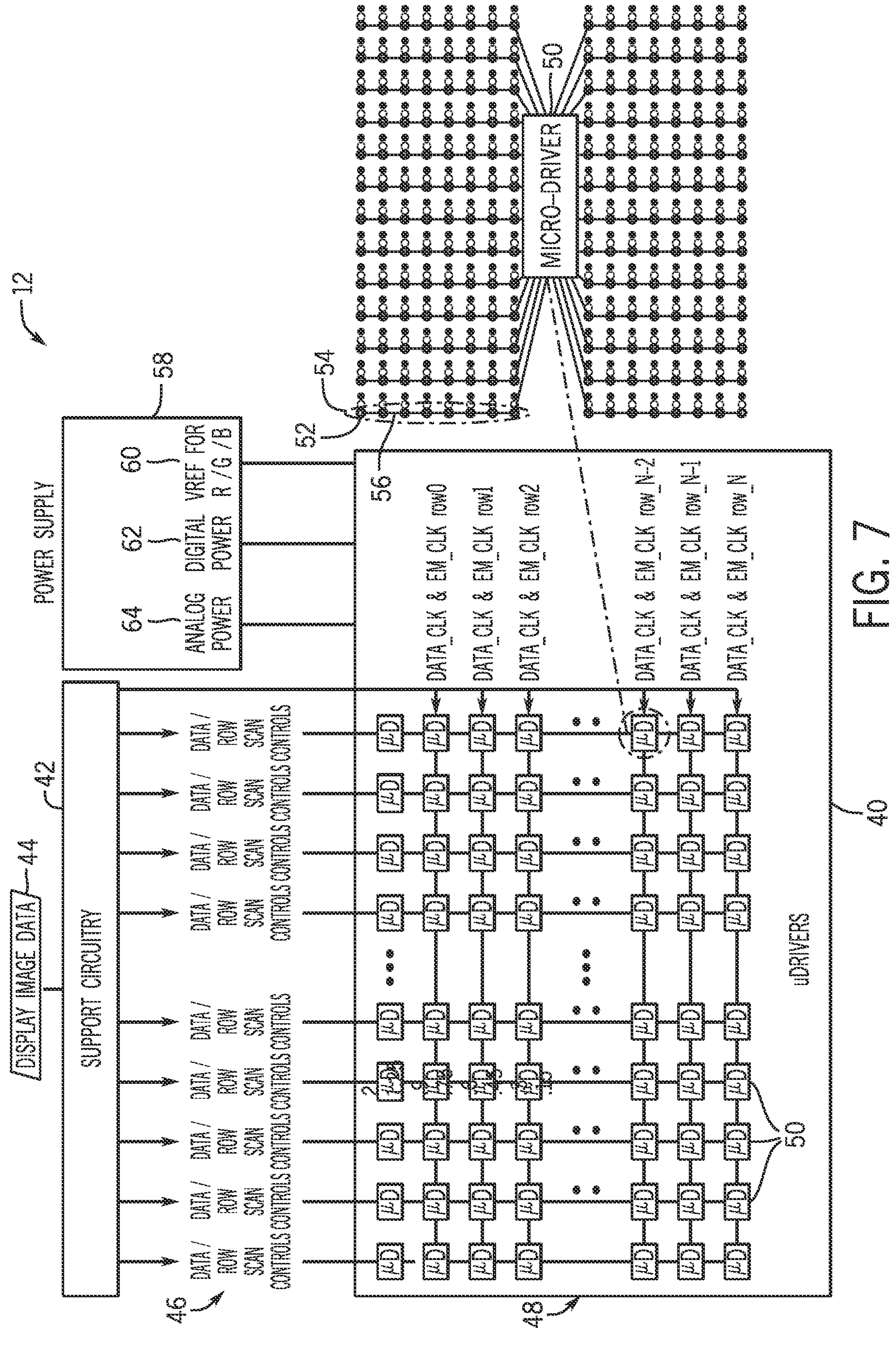
FIG. 7 is a schematic diagram of a micro-LED display that employs micro-drivers to drive display pixels with controls signals, in accordance with an embodiment.

The micro-drivers 50 may be arranged in an array 48, and each micro-driver 50 may drive a number of display pixels 52. Different display pixels 52 (e.g., display sub-pixels) may include different colored micro-LEDs (e.g., a red micro-LED, a green micro-LED, or a blue micro-LED) to emit light according to the display image data 44. Moreover, in some embodiments, the subset of display pixels 52 located at each anode 54 may be associated with a particular color (e.g., red, green, blue). Furthermore, although shown for only a single color channel, it should be appreciated that each anode 54 may have a respective cathode 56 associated with the particular color channel. For example, the depicted cathodes 56 may correspond to red color channels (e.g., subset of red display pixels 52). Indeed, there may be a second set of cathodes 56 that couple to a green color channels (e.g., subset of green display pixels 52) and a third set of cathodes 56 that couple to a blue color channels (subset of blue display pixels 52), but these are not expressly illustrated in FIG. 7 for ease of description.

Additionally, a power supply 58 may provide a reference voltage (VREF) 60 (e.g., to drive the micro-LEDs of the display pixels 52), a digital power signal 62, and/or an analog power signal 64. In some cases, the power supply 58 may provide more than one reference voltage 60 signal. For example, display pixels 52 of different colors may be driven using different reference voltages, and the power supply 58 may generate each reference voltage 60 (e.g., VREF for red, VREF for green, and VREF for blue display pixels 52). Additionally or alternatively, other circuitry on the display panel 40 may step a single reference voltage 60 up or down to obtain different reference voltages and drive the different colors of display pixels 52.

Figure 8:
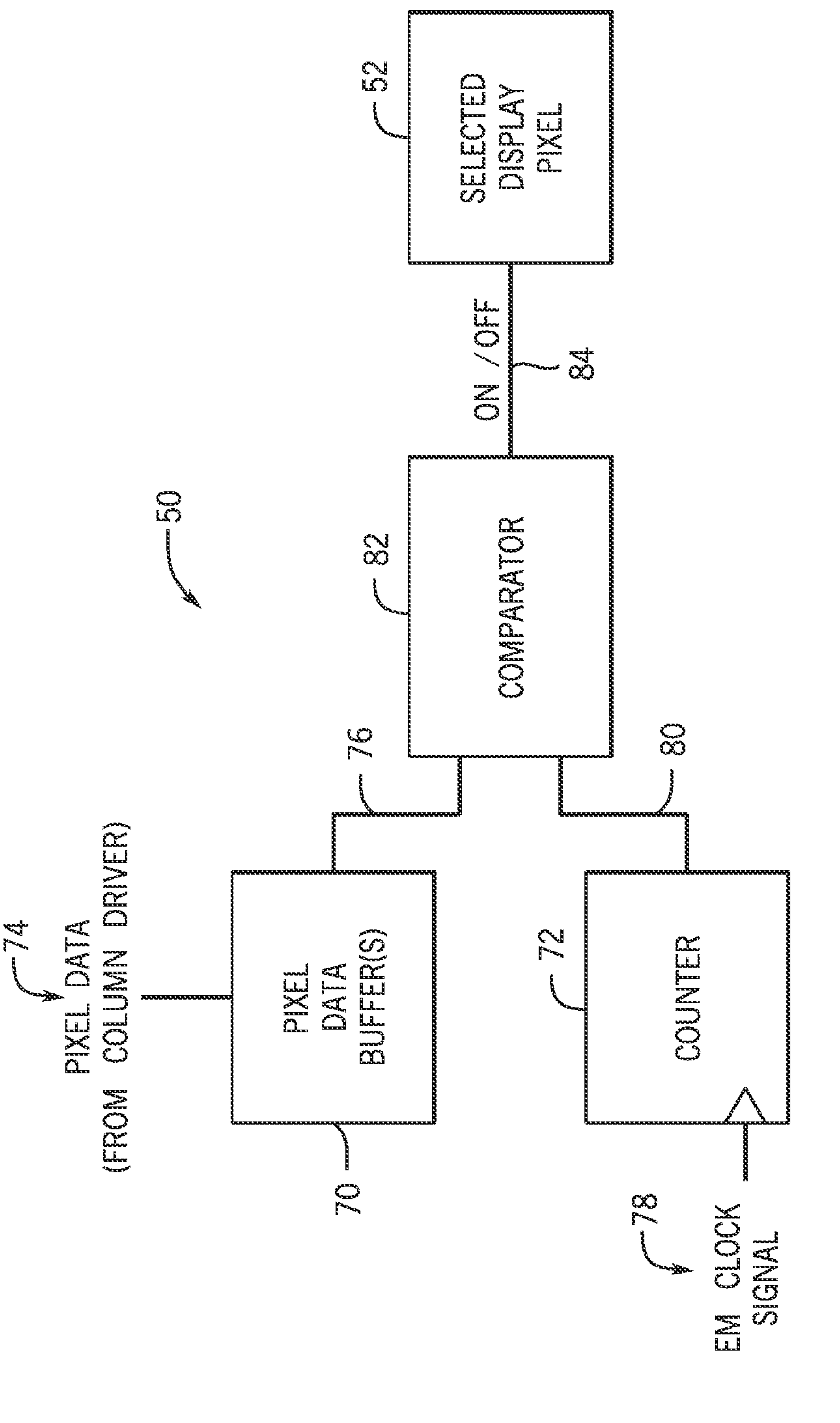
FIG. 8 is a block diagram of circuitry that may be part of a micro-driver of FIG. 7, in accordance with an embodiment.

The micro-drivers 50 may include pixel data buffer(s) 70 and/or a digital counter 72, as shown in FIG. 8. The pixel data buffer(s) 70 may include sufficient storage to hold pixel data 74 that is provided (e.g., via support circuitry 42 such as column drivers) based on the display image data 44. Moreover, the pixel data buffer(s) 70 may take any suitable logical structure based on the order that the pixel data 74 is provided. For example, the pixel data buffer(s) 70 may include a first-in-first-out (FIFO) logical structure or a last-in-first-out (LIFO) structure. Moreover, the pixel data buffer(s) 70 may output the stored pixel data 74, or a portion thereof, as a digital data signal 76 representing a desired gray level for a particular display pixel 52 that is to be driven by the micro-driver 50.

The counter 72 may receive the emission clock signal 78 and output a digital counter signal 80 indicative of the number of edges (only rising, only falling, or both rising and falling edges) of the emission clock signal 78. The digital data signal 76 and the digital counter signal 80 may enter a comparator 82 that outputs an emission control signal 84 in an "on" state when the digital counter signal 80 does not exceed the digital data signal 76, and an "off" state otherwise. The emission control signal 84 may be routed to driving circuitry (not shown) for the display pixel 52 being driven on or off. The longer the selected display pixel 52 is driven "on" by the emission control signal 84, the greater the amount of light that will be perceived by the human eye as originating from the display pixel 52.

Figure 9:
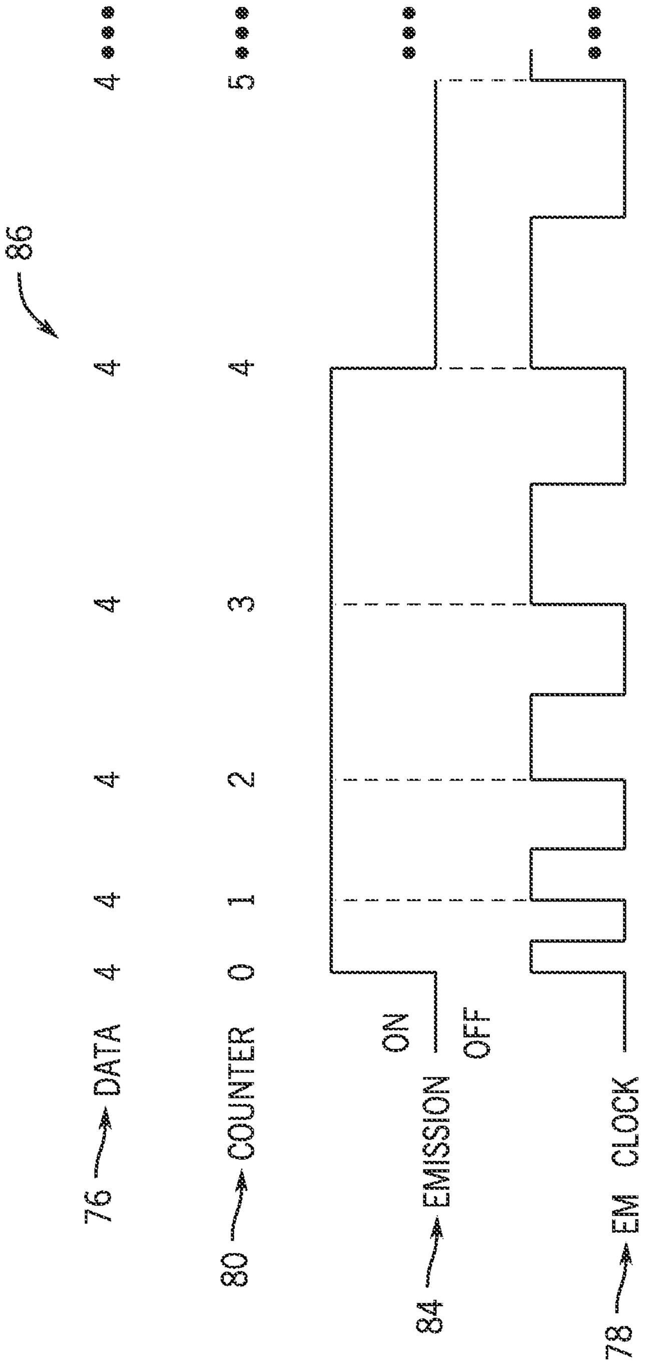
FIG. 9 is a timing diagram of an example operation of the circuitry of FIG. 8, in accordance with an embodiment.

To help illustrate, the timing diagram 86 of FIG. 9 provides an example of the operation of the micro-driver 50. The timing diagram 86 shows the digital data signal 76, the digital counter signal 80, the emission control signal 84, and the emission clock signal 78. In the example of FIG. 9, the gray level for driving the selected display pixel 52 is gray level 4, and this is reflected in the digital data signal 76. The emission control signal 84 drives the display pixel 52 to "on" for a period of time defined for gray level 4 based on the emission clock signal 78. Namely, as the emission clock signal 78 rises and falls, the digital counter signal 80 gradually increases. The comparator 82 outputs the emission control signal 84 to an "on" state as long as the digital counter signal 80 remains less than the digital data signal 76. When the digital counter signal 80 reaches the digital data signal 76, the comparator 82 outputs the emission control signal 84 with an "off" state, thereby causing the selected display pixel 52 no longer to emit light.

In some embodiments, the steps between gray levels, reflected by the steps between emission clock signal 78 edges, may be of consistent width (e.g., linearly additive) or changing width (e.g., indicative of a gamma domain). For example, based on the way humans perceive light, the difference between lower gray levels may be more perceptible than the difference between higher gray levels. The emission clock signal 78 may, therefore, increase the time between clock edges as the frame progresses. The particular pattern of the emission clock signal 78, as generated by the emission TCON, may have increasingly longer differences between edges (e.g., periods) so as to provide a gamma encoding of the gray level of the display pixel 52 being driven.

As discussed above, an electronic display 12 may display an image by pulsing light emissions from display pixels 52 such that the time averaged luminance output is equivalent to the desired luminance level of the display image data 44. Furthermore, a single image frame may be broken up into multiple (e.g., two, four, eight, sixteen, thirty-two, and so on) sub-frames, and a particular pixel may be illuminated (e.g., pulsed) or deactivated during each sub-frame such that the aggregate luminance output over the total image frame is equivalent to the desired luminance output of the particular pixel. In other words, in addition to regulating the duration of the pixel emission during a sub-frame (e.g., as discussed above with reference to FIGS. 7-9) the frequency of the pixel emissions during an image frame may be regulated to maintain an average luminance output during the image frame that appears to the human eye as the desired luminance output. For example, source image data (e.g., indicative of an image) may be processed and split into separate sets of pixel data 74 for each sub-frame. As such, the gray level discussed with respect to the digital data signal 76 may or may not correlate directly to the source image data, as the source image data is representative of the gray level for the image frame, and the digital data signal 76 is representative of the luminance output for a sub-frame. As should be appreciated, the above discussion of the operations of a micro-LED electronic display 12 is but one example of a time-multiplexed operation of an electronic display 12, and the techniques discussed herein may be applicable to other implementations of time-multiplexed electronic displays 12.

Due at least in part to the time-multiplexed nature of operating the electronic display 12 (e.g., micro-LED display), it may be difficult to ascertain the physical utilization of individual pixels until the display image data 44 is or is ready to be generated, such as after other display image processing compensations, corrections, enhancements, etc. have been performed. Indeed, as discussed herein, the display image data 44 may be a digitally coded format (e.g., non-linear gray code) indicative of desired luminance levels to be displayed. Prior to being sent to the display panel 40, the display image data 44 may be generated by converting image data (e.g., via a sub-pixel uniformity digital code conversion of the image processing circuitry 28) from a luminance or current domain to the digital code domain. In general, the image processing circuitry 28 may correct, compensate, enhance, or otherwise alter image data in a luminance domain (e.g., linear domain), gamma domain (e.g., non-linear domain), current domain, voltage domain, etc. to reduce or eliminate image artifacts and/or improve perceived image quality.

Figure 10:
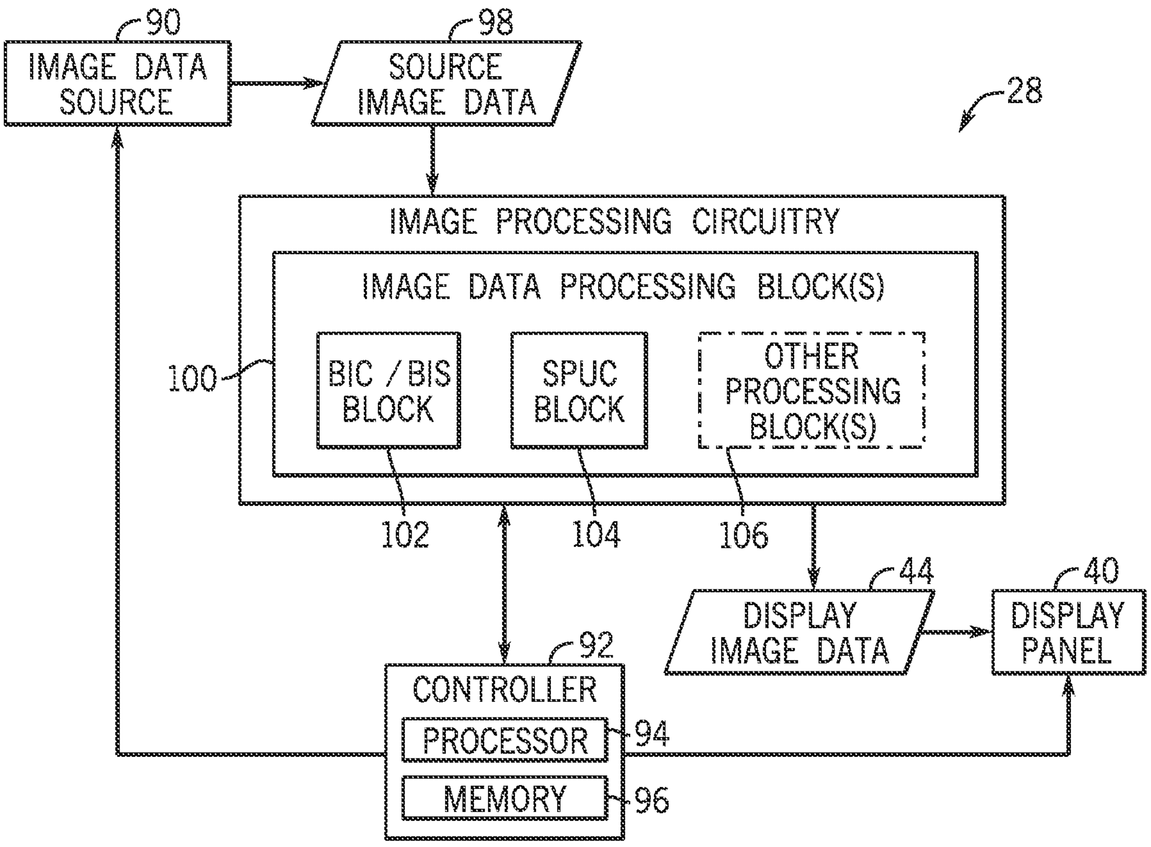
FIG. 10 is a block diagram of the image processing circuitry of FIG. 1 including a burn-in compensation/burn-in statistics (BIC/BIS) block and a sub-pixel uniformity correction (SPUC) block, in accordance with an embodiment.

To help illustrate, a portion of the electronic device 10, including image processing circuitry 28, is shown in FIG. 10. The image processing circuitry 28 may be implemented in the electronic device 10, in the electronic display 12, or a combination thereof. For example, the image processing circuitry 28 may be included in the processor core complex 18, a timing controller (TCON) or the support circuitry 42 in the electronic display 12, or any combination thereof. As should be appreciated, although image processing is discussed herein as being performed via a number of image data processing blocks, embodiments may include hardware or software components to carry out the techniques discussed herein.

In addition to the display panel 40, the electronic device 10 may also include an image data source 90 and/or a controller 92 in communication with the image processing circuitry 28. In some embodiments, the controller 92 may control operation of the image processing circuitry 28, the image data source 90, and/or the display panel 40. To facilitate controlling operation, the controller 92 may include a controller processor 94 and/or controller memory 96. As should be appreciated, the controller processor 94 may be included in the processor core complex 18, the image processing circuitry 28, the electronic display 12, a separate processing module, or any combination thereof and execute instructions stored in the controller memory 96. Moreover, the controller memory 96 may be included in the local memory 20, the main memory storage device 22, a separate tangible, non-transitory, computer-readable medium, or any combination thereof. In general, the image processing circuitry 28 may process source image data 98 for display on one or more electronic displays 12. For example, the image processing circuitry 28 may include a display pipeline, memory-to-memory scaler and rotator (MSR) circuitry, warp compensation circuitry, or additional hardware or software means for processing image data. The source image data 98 may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

The image processing circuitry 28 may receive source image data 98 corresponding to a desired image to be displayed on the electronic display 12 from the image data source 90. The source image data 98 may indicate target characteristics (e.g., luminance data) corresponding to the desired image using any suitable source format, such as an RGB format, an aRGB format, a YCbCr format, and/or the like. Moreover, the source image data 98 may be fixed or floating point and be of any suitable bit-depth. Furthermore, the source image data 98 may reside in a linear color space, a gamma-corrected color space, or any other suitable color space. The image data source 90 may include captured images from cameras 36, images stored in memory, graphics generated by the processor core complex 18, or a combination thereof. Additionally, the image processing circuitry 28 may include one or more sets of image data processing blocks 100 (e.g., circuitry, modules, or processing stages) such as a burn-in compensation/burn-in statistics (BIC/BIS) block 102 and/or a sub-pixel uniformity correction (SPUC) block 104. As should be appreciated, multiple other processing blocks 106 may also be incorporated into the image processing circuitry 28, such as a color management block, image enhancement block, a pixel contrast control (PCC) block, a dither block, a scaling/rotation block, etc. before the BIC/BIS block 102 and/or SPUC block 104. The image data processing blocks 100 may receive and process source image data 98 and output display image data 44 in a format (e.g., digital format and/or resolution) interpretable by the display panel 40 and/or its support circuitry 42. Further, the functions (e.g., operations) performed by the image processing circuitry 28 may be divided between various image data processing blocks 100, and, while the term "block" is used herein, there may or may not be a logical or physical separation between the image data processing blocks 100.

Figure 11:
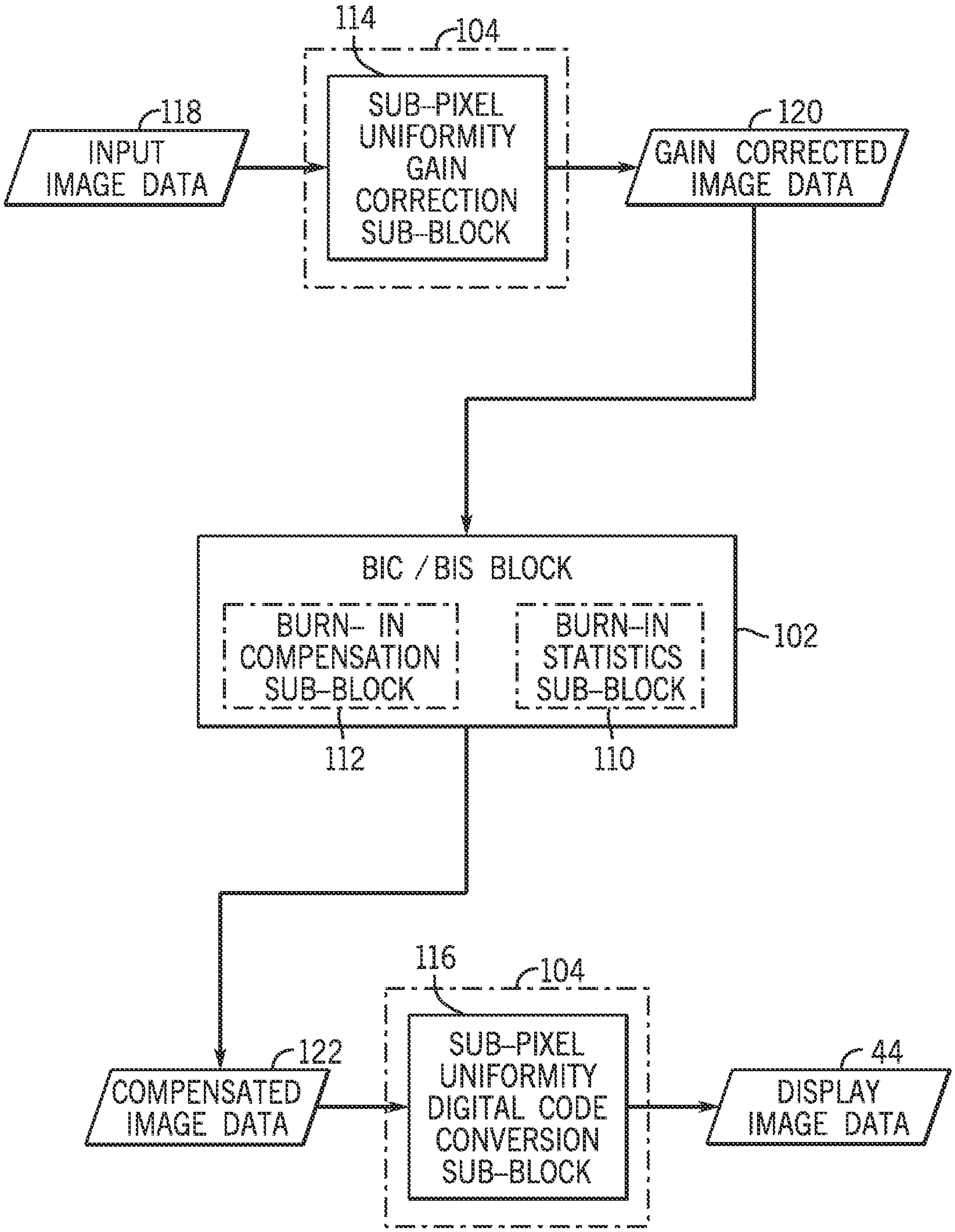
FIG. 11 is a flow diagram of the BIC/BIS block and SPUC block of FIG. 10 receiving input image data and outputting display image data, in accordance with an embodiment.

In general, the BIC/BIS block 102 may compensate the image data for burn-in related aging of the display pixels 52. For example, as the display pixels 52 are utilized over the life of the display panel 40, the display pixels 52 may incur burn-in related aging, whereby the pixels emit less light when given the same amount of driving current or voltage values. Moreover, as different display pixels 52 may be used differently and/or have different environments (e.g., temperature), the display pixels 52 may age non-uniformly. As such, the BIC/BIS block 102 may include a burn-in statistics (BIS) sub-block 110, as shown in FIG. 11, to track an estimated amount of aging for each display pixel 52 or a grouping thereof. Additionally, the BIC/BIS block 102 may include a burn-in compensation (BIC) sub-block 112 to apply gains to the pixel values to compensate for the effects of the estimated amount of aging such that each display pixel 52 appears to have aged uniformly.

Additionally, in some embodiments, the image processing circuitry 28 may include the SPUC block 104 having a sub-pixel uniformity gain correction sub-block 114 and a sub-pixel uniformity digital code conversion sub-block 116. In general, the sub-pixel uniformity gain correction sub-block 114 applies individual gains to pixels values to account for non-uniformities in luminance output efficiency between different display pixels 52. For example, manufacturing variations may cause different display pixels 52 to have different luminance output responses given the same current and voltage. As such, the sub-pixel uniformity gain correction sub-block 114 may apply a gain to the pixel values to adjust an amount of current, voltage, or timing at which the current/voltage is supplied to each display pixel 52 to normalize the differences in manufacturing between display pixels 52. Such gains may be pre-programmed and/or set on a per-display-panel basis at manufacturing (e.g., in response to per-display-panel testing). Moreover, the amount of gain may vary based on the desired luminance level (e.g., pixel value). Additionally, the sub-pixel uniformity digital code conversion sub-block 116 converts the pixel values from a luminance or current domain into a digital code (e.g., grayscale) interpretable by the electronic display 12 (e.g., the support circuitry 42 of the electronic display 12). Moreover, in some embodiments, the sub-pixel uniformity digital code conversion sub-block 116 may also compensate for non-linearities in luminance outputs with regard to the time modulation of the display pixels 52. Indeed, different display pixels 52 (e.g., due to manufacturing tolerances/differences) may exhibit different amounts of luminance output given the same (e.g., compensated via the sub-pixel uniformity gain correction sub-block 114) current and time multiplexing. For example, the voltage swings of the time multiplexing may cause different luminance outputs for different display pixels 52. Moreover, in some embodiments, the sub-pixel uniformity gain correction sub-block 114 may perform a normalization of gains that are implemented by the sub-pixel uniformity digital code conversion sub-block 116 during the conversion to the digital code.

As discussed herein, due at least in part to the time multiplexing of display pixels 52, it may be desired to perform burn-in compensation for the display pixels 52 after other display image processing techniques (e.g., via other processing blocks 106) or any change to the image data that would cause a change in total current draw (e.g., time integrated current over the image frame) of the display pixels 52. Indeed, any changes in luminance affecting the current after the BIC/BIS block 102 would not be taken into account during estimating the age of the display pixels 52 and/or may alter the desired burn-in compensation. Moreover, as the sub-pixel uniformity digital code conversion sub-block 116 performs the conversion to the display image data 44, such conversion may be after the BIC/BIS block 102. As such, in some embodiments, the SPUC block 104 may be separated into the sub-pixel uniformity gain correction sub-block 114 and the sub-pixel uniformity digital code conversion sub-block 116, with the BIC/BIS block 102 disposed (e.g., physically and/or functionally) therebetween.

To help illustrate, FIG. 11 is a flow diagram of the BIC/BIS block 102 and SPUC block 104 receiving input image data 118 and outputting display image data 44. As should be appreciated, as used herein, the input image data 118 may be in any suitable format (e.g., linear domain, gamma domain, current domain) and be generally after other image processing blocks 106, if implemented. The sub-pixel uniformity gain correction sub-block 114 applies individual gains to pixel values of the input image data 118 based on known or estimated differences (e.g., due to manufacturing differences) between the display pixels 52 to generate gain corrected image data 120. As discussed further below, the gain corrected image data 120 may be compensated for burn-in related aging and/or temperature variations across the display panel 40 to generate compensated image data 122. Furthermore, the sub-pixel uniformity digital code conversion sub-block 116 converts the compensated image data 122 into display image data 44 while compensating for the current/luminance response of different display pixels 52 exhibited due to the time multiplexing implementation of the display panel 40 (e.g., micro-LED display panel 40).

As discussed above, the BIC/BIS block 102 tracks an estimated amount of aging of each display pixel 52 or grouping of display pixels 52 and compensates the image data (e.g., input image data 118, gain corrected image data 120, or source image data 98) for burn-in related aging of the display pixels 52. Additionally, in some embodiments, the BIC/BIS block 102 may also compensate for temperature-based current scaling due to the temperature of the display pixels 52. As should be appreciated, although discussed above in the context of the SPUC block 104, the features of the BIC/BIS block 102 may be implemented with or without the SPUC block 104 or other image processing blocks 106.

Figure 12:
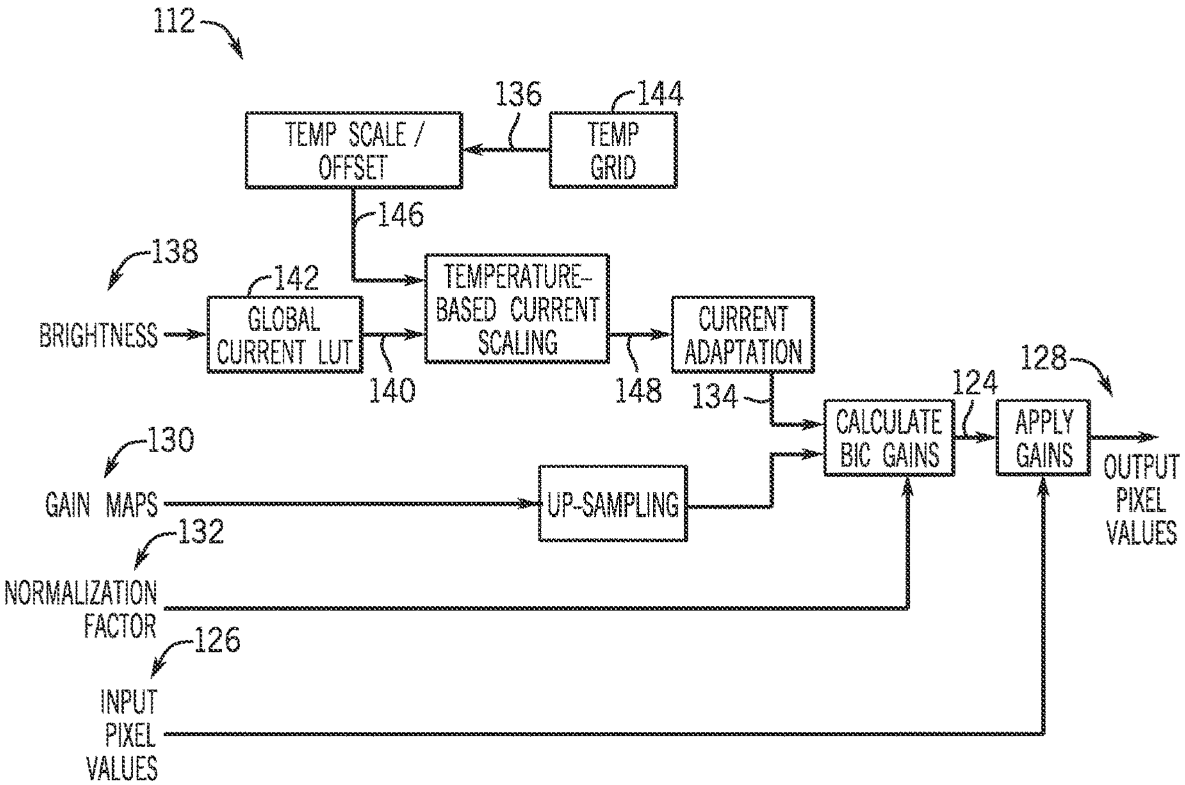
FIG. 12 is a block diagram of a burn-in compensation sub-block, in accordance with an embodiment.

FIG. 12 is a block diagram of the BIC sub-block 112. To compensate for burn-in related aging, the BIC sub-block 112 may apply gains 124 to input pixel values 126 (e.g., of input image data 118, gain corrected image data 120, or source image data 98) to generate output pixel values 128. The gains 124 may gain down input pixel values 126 that will be sent to the less-aged display pixels 52 (which would otherwise be brighter) without gaining down, by gaining down less, or by gaining up the input pixel values 126 that will be sent to the display pixels 52 with the greatest amount of aging (which would otherwise be darker). In this way, the display pixels 52 of the electronic display 12 that are likely to exhibit the greatest amount of aging will appear to be equally as bright as pixels with less aging. As such, perceivable burn-in artifacts on the electronic display 12 may be reduced or eliminated.

To calculate the gains 124 the BIC sub-block 112 may utilize one or more gain maps 130 corresponding to the estimated aging (e.g., burn-in history map(s)) and/or a normalization factor 132. The gain maps 130 may be two-dimensional (2D) maps of per-color-component pixel gains generated based on a cumulative estimated aging of each display pixel 52 or grouping of multiple display pixels 52. Additionally, in some embodiments, the gain maps 130 may be upsampled (e.g., depending on implementation) to spatially support the pixel-resolution of the display panel 40. For example, the burn-in history map(s) storing the estimated aging of the display pixels 52 may be downsampled compared to the pixel-resolution of the display panel 40 (e.g., for storage and/or bandwidth reduction), and the burn-in history map(s) and/or gain maps 130 derived therefrom may be upsampled accordingly. Moreover, in some embodiments, the normalization factor 132 may be used to normalize the luminance output of the display pixels 52 with respect to a maximum gain for each color component.

In addition to the gain maps 130 and/or normalization factor 132, in some embodiments, the BIC sub-block 112 may utilize a current adaptation factor 134 to account for a change in current due to the temperature 136 of the display pixels 52 and/or brightness setting 138 of the electronic display 12. As should be appreciated, the desired brightness setting of a time multiplexed display panel 40 may be related to the current at which the display pixels 52 are driven. However, the actual current delivered to the display pixels 52 may vary depending on temperature. As such, a global current value 140, based on the brightness setting 138 (e.g., global brightness setting) may be used (e.g., via a global current look-up-table 142) to ascertain a global current indicative of the actual current delivered for a preset temperature. Additionally, in some embodiments, a temperature grid 144 may provide temperatures 136 at one or more locations across the electronic device 10. As should be appreciated, the temperature grid 144 may be uniformly spaced or non-uniformly spaced across the display panel 40. Moreover, in some embodiments, the temperatures 136 for each display pixel 52 or groups of display pixels 52 may be interpolated from the temperature grid 144. Furthermore, in some scenarios, a single temperature value (e.g., measured, estimated, or preset value) may utilized instead of individual temperatures 136. The temperatures 136 (or single temperature value) may undergo a temperature scale/offset to define a temperature differential 146 indicative of the local temperature's delta from a preset temperature. The temperature differential 146 may be utilized with the global current 140 (e.g., via using look-up-table) to perform a temperature-based current scaling and generate values of the local currents 148. As should be appreciated, the temperature differential 146 or temperature 136 may be utilized in the temperature-based current scaling depending on implementation. The local currents 148 for each display pixel 52 or groups of display pixels 52 maybe used to calculate the current adaptation factor 134 (e.g., via a look-up-table). As should be appreciated, while look-up-tables are discussed herein, the calculations of the BIC/BIS block 102 may be, in whole or in part, performed via hardware or software (e.g., via the controller processor 94 and controller memory 96). By taking into account the current adaptation factor 134, the normalization factor 132, and the gain maps 130, the gains 124 may be calculated and applied to the input pixel values 126 to generate the output pixel values 128 (e.g., compensated image data 122).

Figure 13:
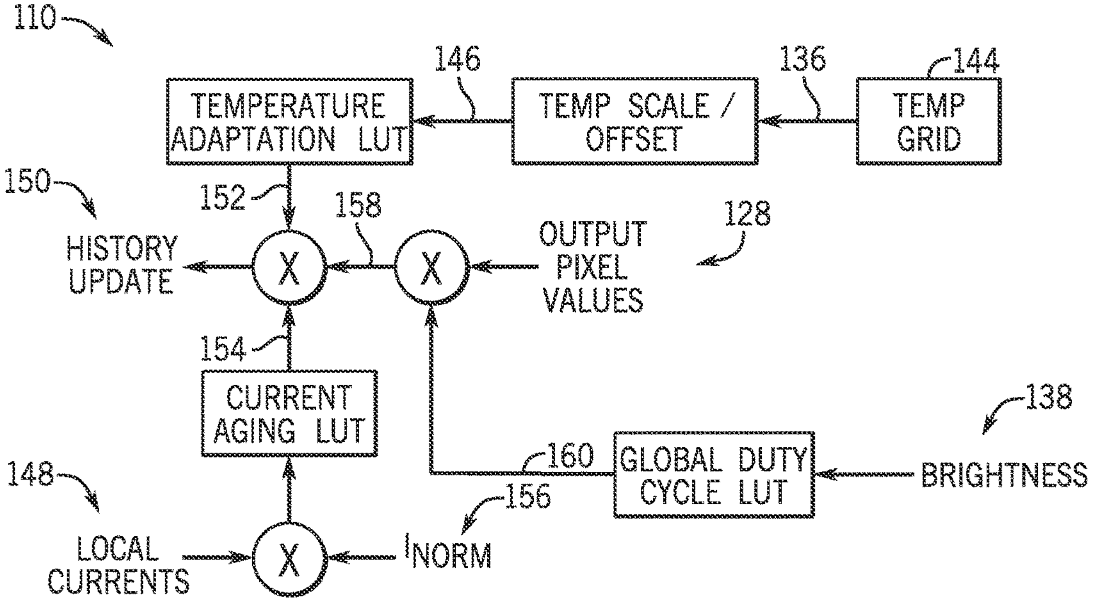
FIG. 13 is a block diagram of a burn-in statistics sub-block, in accordance with an embodiment.

To maintain the estimated amount of aging (e.g., via one or more burn-in history maps) the burn-in statistics sub-block 110 may calculate history updates 150 to be aggregated over time using the output pixel values 128 of the burn-in compensation sub-block 112, as shown in FIG. 13. In addition to changing the delivered current, the local temperature 136 may also affect the aging of display pixels 52. As such, the temperature 136 (e.g., from the temperature grid 144 or single temperature value) or temperature differential 146 calculated therefrom may be used to calculate a temperature adaption factor 152 to account for the aging of the display pixels due to temperature. Additionally, a current aging factor 154 may be calculated (e.g., via a look-up-table) based on the local currents 148 of the display pixels 52 to account for the contribution of aging of the display pixels due to their current utilization. In some embodiments, the local currents 148 may be normalized via a current normalizer 156 prior to calculating the current aging factor 154.

To generate the history update 150, the temperature adaptation factor 152 and the current aging factor 154 may be combined (e.g. via multiplication) with a duty cycle factor 158. Indeed, as the temperature adaptation factor 152 and the current aging factor 154 account for the temperature and current utilization, respectively, of the display pixels 52, the duty cycle factor 158 accounts for how long (e.g., duty cycle per image frame) the pixels are active during the time multiplexed image frame in accordance with the output pixel values 128. For example, the brightness setting 138 may be used to calculate a global duty cycle 160 (e.g., via a look-up-table), which may be combined with the output pixel values 128 to generate the duty cycle factor. As such, by combining the temperature adaptation factor 152, the current aging factor 154, and the duty cycle factor 158, a history update 150 is generated to estimate the amount of aging that has occurred for each display pixel 52 or group of display pixels 52. As should be appreciated, each look-up-table discussed above, or calculation represented thereby, may be shared by or specific to each color component display pixel type. For example, the global duty cycle LUT, the current aging LUT, the temperature adaptation LUT, and/or other LUTs discussed herein may be different for red, green, and/or blue display pixels 52.

Figure 14:
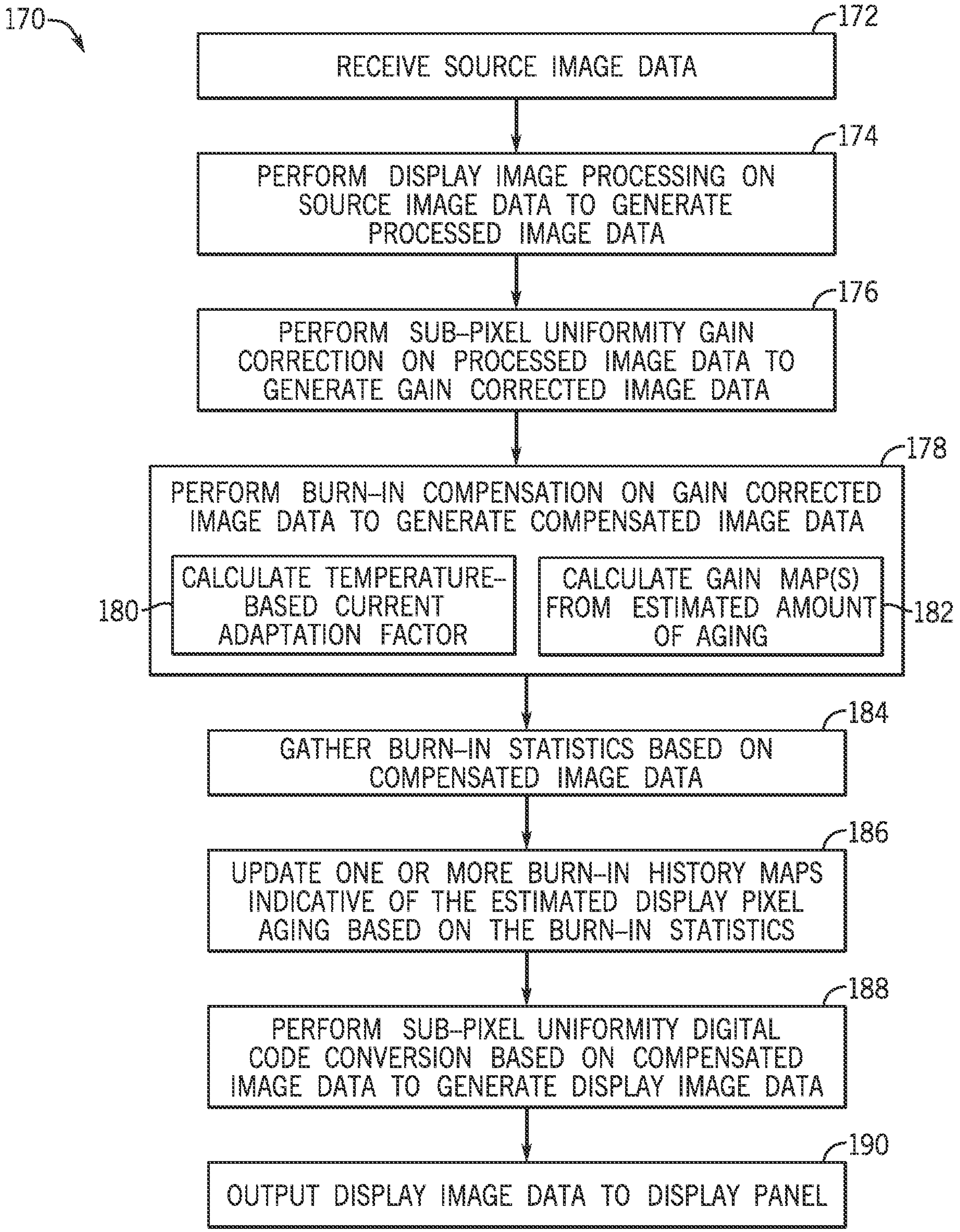
FIG. 14 is a flowchart of an example process for performing burn-in compensation, in accordance with an embodiment.

FIG. 14 is a flowchart 170 of an example process for performing burn-in compensation, which may be in conjunction with sub-pixel uniformity correction. In some embodiments, image processing circuitry 28 may receive source image data 98 (process block 172) and perform one or more display image processing techniques (e.g., via one or more image processing blocks 100) on the source image data 98 (process block 174). Additionally, in some embodiments, sub-pixel uniformity gain correction may be performed (process block 176) on the processed image data (e.g., input image data 118) to generate gain corrected image data 120. As should be appreciated, the gain corrected image data 120 may be indicative of the desired luminance level corrected for sub-pixel non-uniformities in brightness for a given current. Burn-in compensation may be performed (e.g., via the BIC sub-block 112) on the gain corrected image data 120 to generate compensated image data 122 (process block 178). Furthermore, in some embodiments, the burn-in compensation may include calculating a temperature-based current adaptation factor 134 (process block 180) and/or calculating one or more gain maps 130 from an estimated amount of aging (process block 182), such as one or more burn-in history maps. Additionally, burn-in statistics may be gathered (e.g., via the BIS sub-block 110) based on the compensated image data 122 (process block 184), and the burn-in statistics may be used to update one or more burn-in history maps (e.g., a map for each color component display pixel type) indicative of the estimated display pixel aging (process block 186). Further, in some embodiments, a sub-pixel uniformity digital code conversion may be performed on the compensated image data 122 to generate display image data 44 (process block 188), and the display image data 44 may be output to the display panel 40 (process block 190).

Although the above referenced flowchart 170 is shown in a given order, in certain embodiments, process/decision blocks may be reordered, altered, deleted, and/or occur simultaneously. Additionally, the referenced flowchart 170 is given as an illustrative tool and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

a pulsed emission electronic display comprising a plurality of display pixels and configured to display an image by pulsing at least a portion of the plurality of display pixels according to display image data; and image processing circuitry configured to generate the display image data based at least in part on image data indicative of the image by:

performing a first sub-pixel uniformity correction configured to apply a compensation gain to the image data;

performing a second sub-pixel uniformity correction configured to convert the image data from a first format to a second format of the display image data; and performing burn-in compensation between the first sub-pixel uniformity correction and the second sub-pixel uniformity correction, wherein the burn-in compensation is configured to compensate the image data for estimated amounts of burn-in related aging of the plurality of display pixels.

2. The electronic device of claim 1, wherein the pulsed emission electronic display comprises a micro-light-emitting-diode (LED) display, and wherein the plurality of display pixels comprise a plurality of micro-LEDs.

3. The electronic device of claim 1, wherein the image processing circuitry is configured to perform the burn-in compensation immediately prior to the second sub-pixel uniformity correction.

4. The electronic device of claim 3, wherein the image processing circuitry is configured to perform the burn-in compensation immediately after the first sub-pixel uniformity correction.

5. The electronic device of claim 1, wherein performing the burn-in compensation comprises applying gains to pixel values of the image data to compensate for the estimated amounts of burn-in related aging of the plurality of display pixels.

6. The electronic device of claim 5, wherein the gains are based on a current adaptation factor associated with estimated amounts of local current to be delivered to individual display pixels of the plurality of display pixels.

7. The electronic device of claim 6, wherein the estimated amounts of local current to be delivered to the individual display pixels is based on one or more temperatures of the individual display pixels and a global brightness setting of the pulsed emission electronic display.

8. The electronic device of claim 6, wherein the gains are based on a gain map derived by the image processing circuitry based on an accumulated burn-in history map indicative of the estimated amounts of burn-in related aging of the plurality of display pixels.

9. The electronic device of claim 8, wherein the image processing circuitry is configured to generate a history update to maintain the accumulated burn-in history map, wherein the image processing circuitry is configured to generate the history update based on the image data and the estimated amounts of local current to be delivered to the individual display pixels.

10. The electronic device of claim 1, wherein the pulsing of a display pixel of the portion of the plurality of display pixels generates an aggregated luminance output equivalent to a luminance value of the image data.

11. Image processing circuitry comprising:

burn-in compensation circuitry configured to:

receive image data indicative of luminance outputs for a plurality of display pixels; and compensate the image data for estimated amounts of aging associated with the plurality of display pixels to generate compensated image data, wherein compensating the image data comprises applying gains based on estimated amounts of current to be delivered in respective pulses to the plurality of display pixels; and burn-in statistics circuitry configured to track the estimated amounts of aging based on the compensated image data.

12. The image processing circuitry of claim 11, comprising sub-pixel uniformity correction circuitry configured to convert the compensated image data into display image data, wherein the display image data comprises a digital code format interpretable by a time multiplexed display comprising the plurality of display pixels.

13. The image processing circuitry of claim 12, wherein the sub-pixel uniformity correction circuitry is configured to apply second gains to input image data to generate the image data, wherein the second gains compensate the input image data for efficiency variations between the plurality of display pixels.

14. The image processing circuitry of claim 12, wherein converting the compensated image data into the display image data comprises compensating the compensated image data for non-linearities in luminance level perception due to a time modulation of the plurality of display pixels of the time multiplexed display.

15. The image processing circuitry of claim 11, wherein tracking the estimated amount of aging comprises calculating a history update based on the estimated amounts of current to be delivered to the plurality of display pixels.

16. The image processing circuitry of claim 11, wherein the burn-in compensation circuitry is configured to determine the estimated amounts of current to be delivered to the plurality of display pixels based on one or more temperatures and a brightness setting of the plurality of display pixels.

17. The image processing circuitry of claim 16, wherein the one or more temperatures comprise individual temperatures, corresponding to individual locations of the plurality of display pixels, derived from a grid of temperature measurements.

18. A non-transitory machine readable medium comprising instructions, wherein, when executed by one or more processors, the instructions cause the one or more processors to control image processing circuitry to perform operations or to perform the operations, wherein the operations comprise:

receiving image data indicative of luminance outputs for a plurality of display pixels; and compensating the image data for burn-in related aging associated with the plurality of display pixels to generate compensated image data, wherein compensating the image data comprises applying gains based on estimated amounts of aging associated with the plurality of display pixels and estimated amounts of current to be delivered in respective pulses to the plurality of display pixels.

19. The non-transitory machine readable medium of claim 18, wherein the plurality of display pixels comprises a plurality of time multiplexed micro-LED display pixels, and wherein the operations comprise converting the compensated image data into display image data while compensating the compensated image data for non-linearities in luminance level perception due to a time modulation of the plurality of time multiplexed micro-LED display pixels, wherein the display image data comprises a digital code format interpretable by control circuitry of an electronic display comprising the plurality of time multiplexed micro-LED display pixels.

20. The non-transitory machine readable medium of claim 18, wherein the operations comprise:

determining the estimated amounts of current to be delivered to the plurality of display pixels based on one or more temperatures associated with the plurality of display pixels and a global brightness setting of the plurality of display pixels; and tracking the estimated amounts of aging by generating a history update based on the compensated image data and the estimated amounts of current.

* * * * *